US010324869B2

(12) United States Patent
Lee et al.

(10) Patent No.: US 10,324,869 B2
(45) Date of Patent: Jun. 18, 2019

(54) STORAGE DEVICE INCLUDING RANDOM ACCESS MEMORY DEVICES AND NONVOLATILE MEMORY DEVICES

(71) Applicant: SAMSUNG ELECTRONICS CO., LTD., Suwon-si, Gyeonggi-do (KR)

(72) Inventors: Han-Ju Lee, Hwaseong-si (KR); Youngkwang Yoo, Yongin-si (KR); Youngjin Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 326 days.

(21) Appl. No.: 15/260,916

(22) Filed: Sep. 9, 2016

(65) Prior Publication Data

US 2017/0075829 A1 Mar. 16, 2017

(30) Foreign Application Priority Data

Sep. 11, 2015 (KR) .......................... 10-2015-0128901

(51) Int. Cl.
*G06F 13/16* (2006.01)
*G06F 13/40* (2006.01)
*G06F 3/06* (2006.01)

(52) U.S. Cl.
CPC ...... *G06F 13/1673* (2013.01); *G06F 13/4072* (2013.01); *G06F 3/0659* (2013.01)

(58) Field of Classification Search
CPC . G06F 3/0659; G06F 13/1673; G06F 13/4072
See application file for complete search history.

(56) References Cited

U.S. PATENT DOCUMENTS

| 4,847,812 | A  | 7/1989  | Lodhi |
| 7,487,428 | B2 | 2/2009  | Co et al. |
| 7,679,133 | B2 | 3/2010  | Son et al. |
| 8,189,328 | B2 | 5/2012  | Kanapathippillai et al. |
| 8,553,466 | B2 | 10/2013 | Han et al. |
| 8,559,235 | B2 | 10/2013 | Yoon et al. |
| 8,654,587 | B2 | 2/2014  | Yoon et al. |
| 8,880,791 | B2 | 11/2014 | Chen et al. |
| 8,904,099 | B2 | 12/2014 | Chen et al. |

(Continued)

FOREIGN PATENT DOCUMENTS

KR     1020160144564 A    12/2016

*Primary Examiner* — Ernest Unelus
(74) *Attorney, Agent, or Firm* — Volentine, Whitt & Francos, PLLC

(57) ABSTRACT

A storage device includes random access memories, nonvolatile memory devices, a controller configured to control the nonvolatile memory devices, and a driver circuit configured to receive a command and an address from an external device, output a buffer command according to the command and the address, and transmit the command and the address to one of a first channel connected to the random access devices and a second channel connected to the controller according to the command and the address. The storage device further includes a plurality of data buffers configured to communicate with the external device and electrically connect the external device to one of a third channel connected to the random access memory devices and a fourth channel connected to the controller in response to the buffer command. Each of the data buffers includes a FIFO (first-in first-out) circuit.

19 Claims, 15 Drawing Sheets

(56) References Cited

U.S. PATENT DOCUMENTS

| | | |
|---|---|---|
| 8,949,502 B2 | 2/2015 | McKnight et al. |
| 2011/0233648 A1 | 9/2011 | Seol et al. |
| 2013/0086309 A1 | 4/2013 | Lee et al. |
| 2014/0095769 A1 | 4/2014 | Borkenhagen |
| 2014/0146624 A1 | 5/2014 | Son et al. |
| 2014/0181364 A1* | 6/2014 | Berke ............... G06F 13/16 711/103 |
| 2014/0237157 A1 | 8/2014 | Takefmam et al. |
| 2014/0237176 A1 | 8/2014 | Takefman et al. |
| 2014/0237205 A1 | 8/2014 | Takefman et al. |
| 2016/0342487 A1* | 11/2016 | Ware ................. G11C 7/20 |

* cited by examiner

STORAGE DEVICE INCLUDING RANDOM ACCESS MEMORY DEVICES AND NONVOLATILE MEMORY DEVICES

CROSS-REFERENCE TO RELATED APPLICATIONS

A claim of priority under 35 U.S.C. § 119 is made to Korean Patent Application No. 10-2015-0128901, filed on Sep. 11, 2015, the entire contents of which are hereby incorporated by reference.

BACKGROUND

The present inventive concept herein relates to semiconductor memories, and more particularly, to a storage device including random access memory devices and nonvolatile memory devices.

Computing devices generally include a processor, a main memory device and a storage device. As semiconductor technology develops, performance of processors, as well as main memory devices and storage devices, has improved. As performance of processors, main memory devices and storage devices has improved, the performance of computing devices has consequently also improved.

The performance of storage devices is a factor that usually impedes operation speed of computing devices. However, as nonvolatile memories such as a phase change random access memory (PRAM), resistive RAM (RRAM), magnetic RAM (MRAM), and ferroelectric RAM (FeRAM) are now being used in storage devices, the performance of storage devices has greatly improved. Accordingly, attention has recently shifted to the communication speed between the processor and the storage device as a factor impeding operation speed of computing devices.

Thus, there is a desire to provide devices and methods for improving communication speed between processors and storage devices. Devices and methods for solving problems related to the process of improving communication speed between processors and storage devices are also desired.

SUMMARY

Embodiments of the inventive concept provide a storage device. The storage device includes a plurality of random access memories; a plurality of nonvolatile memory devices; a controller configured to control the nonvolatile memory devices; and a driver circuit configured to receive a command and an address from an external device, output a buffer command according to the command and the address, and transmit the command and the address to one of a first channel connected to the random access devices and a second channel connected to the controller according to the command and the address. The storage device further includes a plurality of data buffers configured to communicate with the external device and electrically connect the external device to one of a third channel connected to the random access memory devices and a fourth channel connected to the controller in response to the buffer command. Each of the data buffers includes a (first-in first-out (FIFO) circuit.

Embodiments of the inventive concept also provide a storage device that includes a plurality of random access memory devices configured to communicate with an external device through a third channel; a plurality of nonvolatile memory devices; a controller configured to communicate with the external device through a fourth channel and to control the nonvolatile memory devices; and a driver circuit configured to receive a command and an address from the external device and to transmit the command and the address to one of a first channel connected to the random access memory devices and a second channel connected to the controller according to the command and the address. The storage device further includes a first-in first-out (FIFO) circuit provided in the fourth channel.

Embodiments of the inventive concept further provide a storage device including a plurality of random access memories; a plurality of nonvolatile memory devices; a plurality of data buffers configured to communicate with an external device and to electrically connect the external device with one of the random access memories and the nonvolatile memories responsive to a buffer command; and a first-in first-out (FIFO) circuit disposed in a channel between the data buffers and the nonvolatile memory devices, and configured to store data provided by the external device and output the stored data to the nonvolatile memory devices. The channel has a bandwidth smaller than a bandwidth of a channel between the data buffers and the random access memories.

BRIEF DESCRIPTION OF THE FIGURES

Embodiments of the inventive concept will be described below in more detail with reference to the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION

Figure 1:
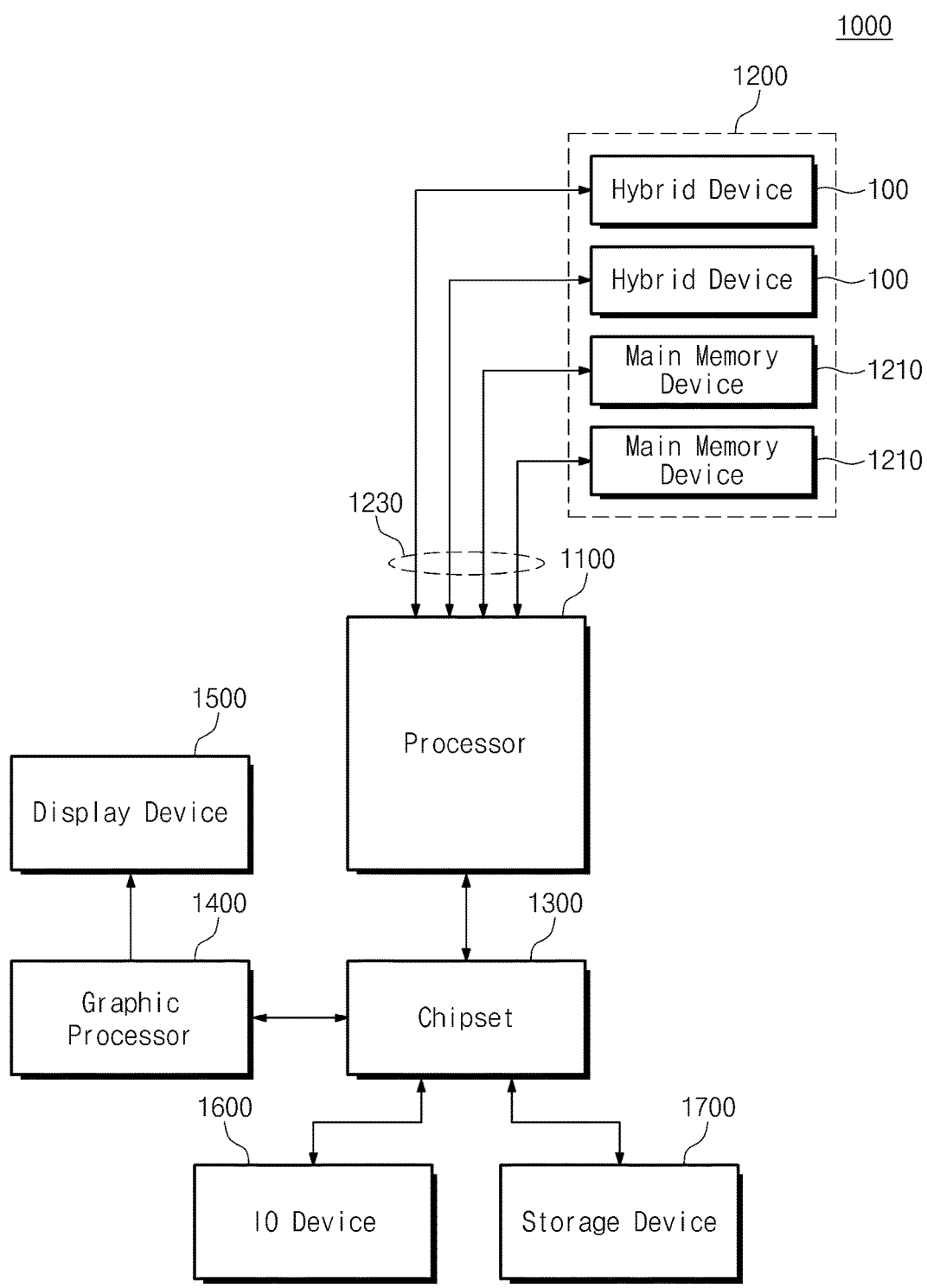
FIG. 1 illustrates a block diagram of a computing device in accordance with some embodiments of the inventive concept.

Embodiments of inventive concepts will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

It should be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a computing device in accordance with some embodiments of the inventive concept. Referring to FIG. 1, computing device 1000 includes processor 1100, high speed storage device 1200, chipset 1300, graphic processor 1400, display device 1500, I/O (input/output) device 1600, and storage device 1700.

The processor 1100 controls an overall operation of the computing device 1000 and performs a logical operation. The processor 1100 drives an OS (operating system) and applications. The processor 1100 may be a CPU (central processing unit) or an AP (application processor).

The high speed storage device 1200 is configured to communicate with the processor 1100 through the high speed interface 1230. The high speed storage device 1200 includes one or more main memory devices 1210 and one or more hybrid storage devices 100. Hereinafter, the one or more main memory devices 1210 may be referred to in a singular or plural sense, and the one or more hybrid storage devices 100 may be referred to in a singular or plural sense. The main memory device 1210 may be used as an operation memory of the processor 1100. The main memory device 1210 may include a dynamic random access memory (DRAM), or more specifically a double data rate (DDR) synchronous dynamic random access memory (SDRAM). The main memory device 1210 may be configured to operate based on a specification of a registered dual in-line memory module (RDIMM) or a load reduced DIMM (LRDIMM). The high speed interface 1230 may include a DIMM interface determined by a specification.

The hybrid storage device 100 may be connected to the high speed interface 1230 similar to the main memory device 1210, for example by a DIMM interface. The hybrid storage device 100 may include nonvolatile memory devices such as flash memory, phase-change random access memory (PRAM), resistive RAM (RRAM), magnetic RAM (MRAM), ferroelectric RAM (FeRAM), or the like, and random access memory devices such as DRAM, SRAM, MRAM, PRAM, RRAM, FeRAM, or the like. The nonvolatile memory devices included in the hybrid storage device 100 provide data permanence, while the random access memory devices included in the hybrid storage device 100 provide a high speed characteristic of data access. That is, the hybrid storage device 100 may have flexibility of supporting permanence with respect to some data and supporting high speed access characteristics with respect to some data. Since the hybrid storage device 100 is connected to the high speed interface 1230, it may have improved communication speed. The hybrid storage device 100 may be configured to operate based on a specification of a DIMM, more specifically a RDIMM or LRDIMM.

The chipset 1300 is configured to arbitrate a connection between the processor 1100 and other devices according to control of the processor 1100. For example, the chipset 1300 may include a south bridge. The chipset 1300 may also include a sound processor, an Ethernet adapter, or other components.

The graphic processor 1400 is configured to perform image processing and display an image on the display device 1500. The graphic processor 1400 may be a GPU (graphic processing unit). In some embodiments, the graphic processor 1400 may be included inside the chipset 1300.

The display device 1500 is configured to output an image according to control of the graphic processor 1400. For example, the display device 1500 may include a liquid crystal display (LCD) device, a light emitting diode (LED) display device, a beam projector, or the like.

The I/O device 1600 may include an input device configured to receive a signal from a user, and an output device configured to output a signal to a user. For example, the I/O device 1600 may include an input device such as a keyboard, a mouse, a microphone, a touchpad, a touch panel, or the like, and an output device such as a speaker, a ramp, a printer, or the like.

The storage device 1700 is configured to operate according to control of the chipset 1300. The storage device 1700 communicates with the chipset 1300 based on an interface such as serial At attachment (SATA), universal serial bus (USB), universal flash storage (UFS), peripheral component interconnection (PCI), PCIexpress, a NVMexpress, small computer system interface (SCSI), serial attached SCSI (SAS), or the like.

A communication speed (e.g., a communication speed between the processor 1100 and the hybrid storage device 100) of the hybrid storage device 100 directly connected to the processor 1100 through the high speed interface 1230 is higher than a communication speed (e.g., a communication speed between the chipset 1300 and the storage device 1700) of the storage device 1700 connected to the chipset 1300. Thus, if the hybrid storage device 100 connected to the processor 1100 through the high speed interface 1230 is provided, operation performance of the computing device 1000 is improved.

Figure 2:
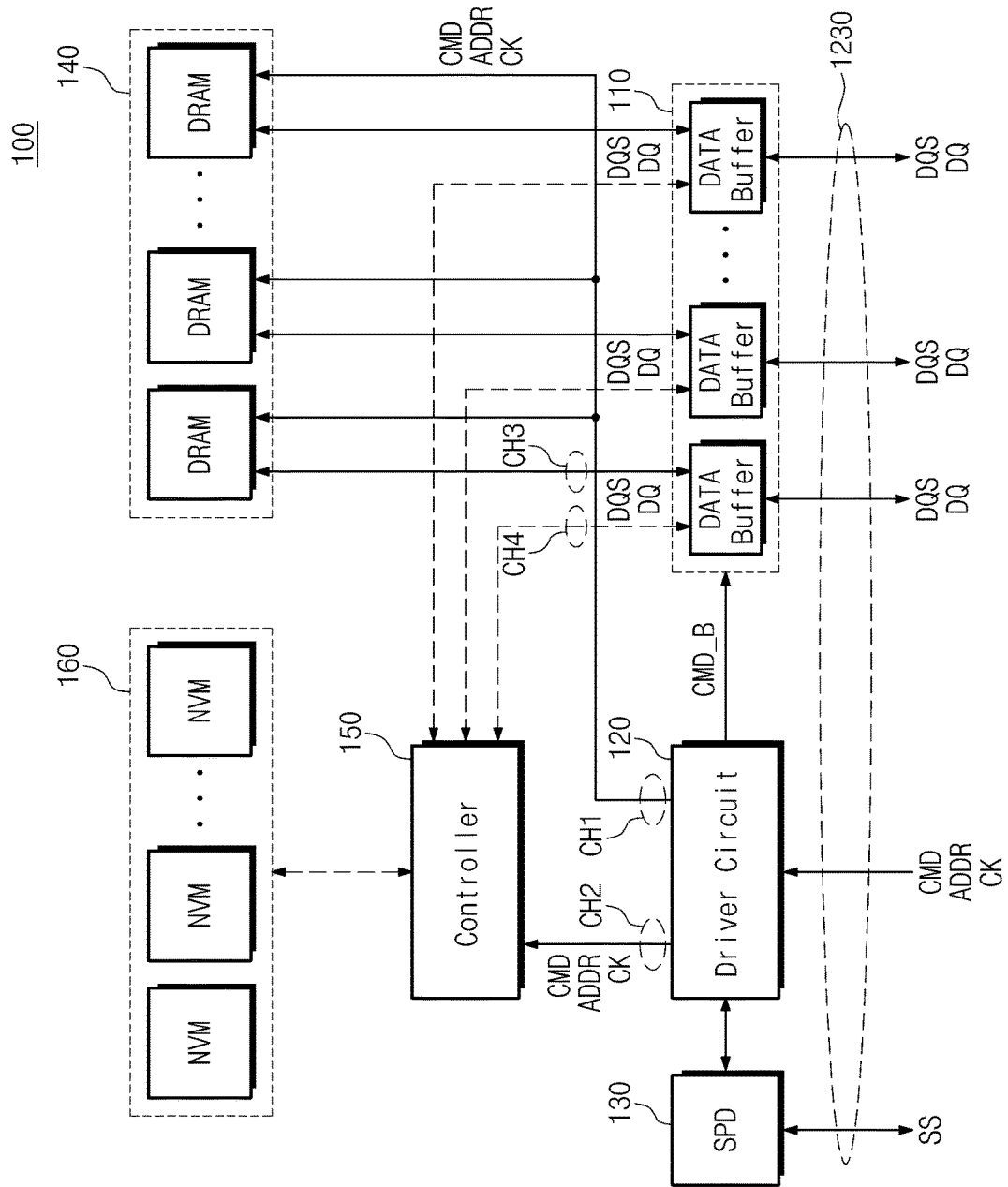
FIG. 2 illustrates a block diagram of a hybrid storage device in accordance with some embodiments of the inventive concept.

FIG. 2 illustrates a block diagram of a hybrid storage device in accordance with some embodiments of the inventive concept. Referring to FIGS. 1 and 2, the hybrid storage device 100 includes data buffers 110, driver circuit 120, a serial presence detect (SPD) 130, random access memory devices 140, a controller 150, and nonvolatile memory devices 160.

The data buffers 110 may receive data signals DQ and data strobe signals DQS through the high speed interface 1230. The data buffers 110 may be configured according to a DDR4 LRDIMM specification. For example, 9 data buffers 110 may be provided to the hybrid storage device 100. Each of the data buffers 110 can communicate 8 data signals DQ and 2 data strobe signals DQS to an external device, for instance, the processor 1100.

The data buffers 110 can communicate with the random access memory devices 140. For example, in response to a buffer command (CMD_B), the data buffers 110 can transmit data signals DQ and data strobe signals DQS received from the external device to the random access memory devices 140 through a third channel CH3. In response to the buffer command (CMD_B), the data buffers 110 can transmit data signals DQ and data strobe signals DQS received from the random access memory devices 140 through the third channel CH3 to the external device.

The data buffers 110 can communicate with the controller 150. In response to the buffer command (CMD_B), the data buffers 110 can transmit data signals DQ and data strobe signals DQS received from the external device to the controller 150 through a fourth channel CH4. In response to the buffer command (CMD_B), the data buffers 110 can transmit data signals DQ and data strobe signals DQS received from the controller 150 through the fourth channel CH4 to the external device.

In response to the buffer command (CMD_B), the data buffers 110 can electrically connect the external device to one of the third channel CH3 and the fourth channel CH4. That is, in response to the buffer command (CMD_B), the data buffers 110 can exchange data signals DQ and data strobe signals DQS between the random access memory devices 140 and the external device, or can exchange data signals DQ and data strobe signals DQS between the controller 150 and the external device.

The data buffers 110 are configured to store received data signals DQ and output the stored data signals DQ. For example, the data buffers 110 can store and output data signals DQ in synchronization with data strobe signals DQS. By storing and outputting data signals DQ, the data buffers 110 can rearrange timing between the data signals DQ and the data strobe signals DQS. That is, a skew of the data signals DQ may be improved based on the data buffers 110.

The driver circuit 120 receives a command CMD, an address ADDR and a clock CK from the external device through the high speed interface 1230. The driver circuit 120 outputs the buffer command (CMD_B) based on the received command CMD and the received address ADDR. For example, when the received address ADDR indicates the random access memory devices 140, the driver circuit 120 outputs the buffer command (CMD_B) requesting a communication with the random access memory devices 140. When the received address ADDR indicates the nonvolatile memory devices 160, the driver circuit 120 outputs the buffer command (CMD_B) requesting a communication with the controller 150.

The driver circuit 120 transmits the command CMD, the address ADDR and the clock CK that are received from the external device through the high speed interface 1230 to the random access memory devices 140 or the controller 150. For example, when the received address ADDR indicates the random access memory devices 140, the driver circuit 120 transmits the command CMD, the address ADDR and the clock CK that are received to the random access memory devices 140 via the first channel CH1. When the received address ADDR indicates the nonvolatile memory devices 160, the driver circuit 120 transmits the command CMD, the address ADDR and the clock CK that are received to the controller 150 via the second channel CH2.

The driver circuit 120 may be configured to perform functions and operations of a registered clock driver (RCD) according to a DIMM specification.

The SPD 130 is configured to communicate with the processor 1100 through supplemental signals SS of the high speed interface 1230. The SPD 130 is configured to communicate with the driver circuit 120 through the supplemental signals SS. The supplemental signals SS may include serial peripheral interface (SPI) signals, inter-integrated circuit (I2C) signals, universal asynchronous receiver/transmitter (UART) signals, or the like. For example, the SPD 130 can store information about a physical characteristic, a logical characteristic, and a driving characteristic of the hybrid storage device 100. The information stored in the SPD 130 can be read by the processor 1100 through the supplemental signals SS of the high speed interface 1230 when power is supplied to the computing device 1000.

The random access memory devices 140 exchange data signals DQ and data strobe signals DQS with the data buffers 110 through a third channel CH3. The random access memory devices 140 receive the command CMD, the address ADDR and the clock CK from the driver circuit 120 through a first channel CH1. The random access memory devices 140 perform read and write operations in response to the command CMD, the address ADDR and the clock CK. Data to be written in the random access memory devices 140 may be received by the random access memory devices 140 as the data signals DQ and the data strobe signals DQS transmitted from the data buffers 110. Data read from the random access memory devices 140 may be transmitted to the data buffers 110 as the data signals DQ and the data strobe signals DQS.

The random access memory devices 140 may include devices satisfying a DIMM specification, for example, a DRAM.

The controller 150 communicates the data signals DQ and the data strobe signals DQS from the data buffers 110. For example, when the data signals DQ and the data strobe signals DQS are received from the data buffers 110, the controller 150 receives the data signals DQ in synchronization with the data strobe signal DQS. When the controller 150 outputs the data signals DQ and the data strobe signals DQS, the controller 150 outputs the data signals DQ in synchronization with the data strobe signal DQS. For example, the controller 150 communicates with the data buffers 110 according to a communication regulation of the data signals DQ and the data strobe signals DQS defined by a DIMM specification.

The controller 150 receives the command CMD, the address ADDR and the clock CK from the driver circuit 120. The controller 150 accesses the nonvolatile memory devices 160 in response to the command CMD, the address ADDR and the clock CK that are received.

The controller 150 can exchange a control signal with the nonvolatile memory devices 160 through a control channel and can exchange the command CMD, the address ADDR and the data signals DQ with the nonvolatile memory devices 160 through an I/O (input/output) channel.

For example, the controller 150 transmits a chip enable signal (/CE) selecting at least one nonvolatile memory device among the nonvolatile memory devices 160, a command latch enable signal (CLE) indicating that signals transmitted from the controller 150 through the I/O channel are second commands for the nonvolatile memory devices 160, an address latch enable signal (ALE) indicating that signals being transmitted from the controller 150 through the I/O channel are second addresses for the nonvolatile memory devices, a read enable signal (/RE) that is generated from the clock CK by the controller 150 and is periodically toggled to be used to adjust timing in a read operation, a write enable signal (/WE) activated by the controller 150 when the second commands or the second addresses are transmitted, a write protecting signal (/WP) activated by the controller 150 to prevent an unwanted write or erase when a power supply is changed, and a second data strobe signal (DQS) for the nonvolatile memory devices 160 that is generated from the clock CK by the controller 150 and is periodically toggled in a write operation to be used to adjust a sync of data transmitted to the nonvolatile memory devices 160.

The controller 150 may also receive a ready & busy signal (R/nB) from the nonvolatile memory devices 160 indicating that the nonvolatile memory devices 160 are performing a program, erase or read operation, and the second data strobe signal (DQS) that is generated from the read enable signal (/RE) by the nonvolatile memory devices 160 and is periodically toggled to be used to adjust an output sync of data transmitted from the nonvolatile memory devices 160.

The nonvolatile memory devices 160 may include flash memory devices. However, the nonvolatile memory devices 160 are not limited to include flash memory devices. The nonvolatile memory devices 160 may include various kinds of nonvolatile memory devices such as phase-change RAM (PRAM), magnetic RAM (MRAM), resistive RAM (RRAM), ferroelectric RAM (FeRAM), or the like.

The controller 150 and the nonvolatile memory devices 160 may be connected to one another based on a channel and a way. One channel may include one data channel and one control channel. One data channel may include 8 data lines. One control channel may include control lines transmitting the chip enable signals (/CE), the command latch enable signal (CLE), the address latch enable signal (ALE), the read enable signal (/RE), the write enable signal (/WE), the write protecting signal (/WP), and the ready & busy signals (R/nB).

Nonvolatile memory devices connected to one channel may form a way. If n number of nonvolatile memory devices are connected to one channel, the nonvolatile memory devices may form an n-way. Nonvolatile memory devices that belong to one way can share data lines and control lines transmitting the chip enable signals (/CE), the command latch enable signal (CLE), the address latch enable signal (ALE), the read enable signal/RE, the write enable signal/WE, and the write protecting signal (/WP). Each of the nonvolatile memory devices that belong to one way can communicate with the controller 150 through exclusive control lines transmitting the chip enable signal (/CE) and the ready & busy signals (R/nB).

The controller 150 can alternately access n-way nonvolatile memory devices connected to one channel. The controller 150 can independently access nonvolatile memory devices connected to different channels from one another. The controller 150 can alternately or simultaneously access nonvolatile memory devices connected to different channels from one another.

The nonvolatile memory devices 160 may be connected to the controller 150 in a wide TO form. For example, nonvolatile memory devices connected to different channels from one another may share a control line of one chip enable signal (/CE). The nonvolatile memory devices sharing a control line of one chip enable signal (/CE) may be accessed at the same time. Since data lines of different channels are used at the same time, a wide input/output bandwidth may be accomplished.

As described above, according to an address ADDR received from the external device, the hybrid storage device 100 sets a communication path between the hybrid storage device 100 and an external device so that the external device accesses one of the random access memory devices 140 and the nonvolatile memory devices 160. That is, the random access memory devices 140 and the nonvolatile memory devices 160 of the hybrid storage device 100 may be identified by the external device and may be addressable. Information about the random access memory devices 140 and the nonvolatile memory devices 160 of the hybrid storage device 100 is stored in the SPD 130 and may be identified by the external device when power is turned on.

Referring to FIGS. 1 and 2, if the hybrid storage device 100 is connected to the processor 1100 through the high speed interface 1230, the processor 1100 can directly access the random access memory devices 140 and the nonvolatile memory devices 160. Thus, a speed of the computing device 1000 is improved and flexibility of the computing device 1000 is improved.

Figure 3:
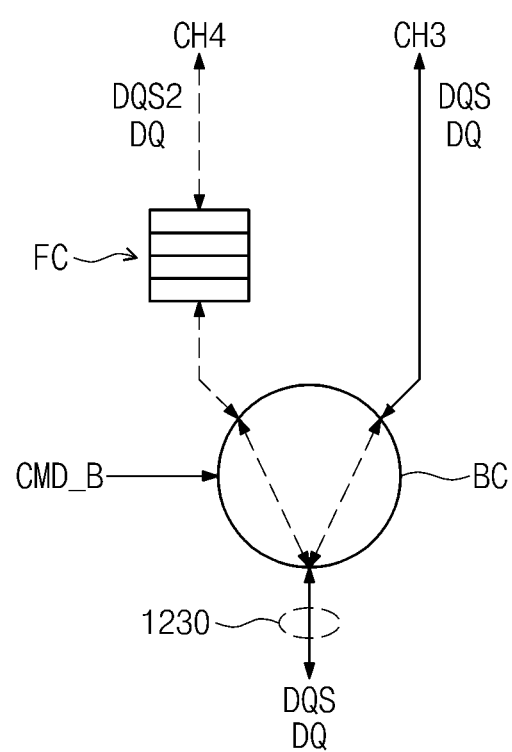
FIG. 3 illustrates an example of data buffers.

FIG. 3 illustrates an example of data buffers. Referring to FIGS. 2 and 3, the data buffer 110_1 includes a buffer circuit (BC) and a FIFO (first-in first-out) circuit (FC). The buffer circuit (BC) can receive the data signals DQ and the data strobe signals DQS from the high speed interfaces 1230. In response to the buffer command (CMD_B), the buffer circuit (BC) can store the data signals DQ in synchronization with the data strobe signals DQS. In response to the buffer command (CMD_B), the buffer circuit (BC) can output the stored data signals DQ to the third channel CH3 or the FIFO circuit (FC) in synchronization with the data strobe signals DQS.

In response to the buffer command (CMD_B), the buffer circuit (BC) can receive the data signals DQ and the data strobe signals DQS from the FIFO circuit (FC) or the random access memory devices 140. The buffer circuit (BC) can store the data signals DQ in synchronization with the data strobe signals DQS. In response to the buffer command (CMD_B), the buffer circuit (BC) can output the stored data signals DQ through the high speed interface 1230 in synchronization with the data strobe signals DQS.

The FIFO circuit (FC) can store data signal DQ output from the buffer circuit (BC) and can output the stored data signals DQ to the controller 150 through the fourth channel CH4 according to a FIFO (first-in first-out) policy. The FIFO circuit (FC) can store data signal DQ output from the controller 150 through the fourth channel CH4 and can output the stored data signals DQ to the buffer circuit (BC) according to a FIFO (first-in first-out) policy.

In the fourth channel CH4, the controller 150 and the FIFO circuit (FC) can exchange the data signals DQ with each other based on second data strobe signals DQS2. For example, the second data strobe signals DQS2 may have a frequency lower than a frequency of the data strobe signals DQS communicated through the third channel CH3. The controller 150 can generate the second data strobe signals DQS2 having a frequency lower than a frequency of the data strobe signals DQS on the basis of the clock CK. Using the second data strobe signals DQS2, the controller 150 can read the data signals DQ from the FIFO circuit (FC) or can write the data signals DQ in the FIFO circuit (FC).

In some embodiments, the second data strobe signals DQS2 may have the same frequency as the frequency of the data strobe signals DQS communicated through the third channel CH3. The controller 150 generates the data strobe signals DQS from the clock signal CK, and can read the data signals DQ from the FIFO circuit (FC) in synchronization with the data strobe signals DQS or can write the data signals DQ in the FIFO circuit (FC).

A speed that the controller 150 accesses the nonvolatile memory devices 160 may be lower than a speed that the random access memory devices 140 is accessed by the external device. As illustrated in FIG. 3, if the FIFO circuit (FC) is provided, a low access speed of the nonvolatile memory devices 160 is compensated and a speed of the hybrid storage device 100 is improved.

Figure 4:
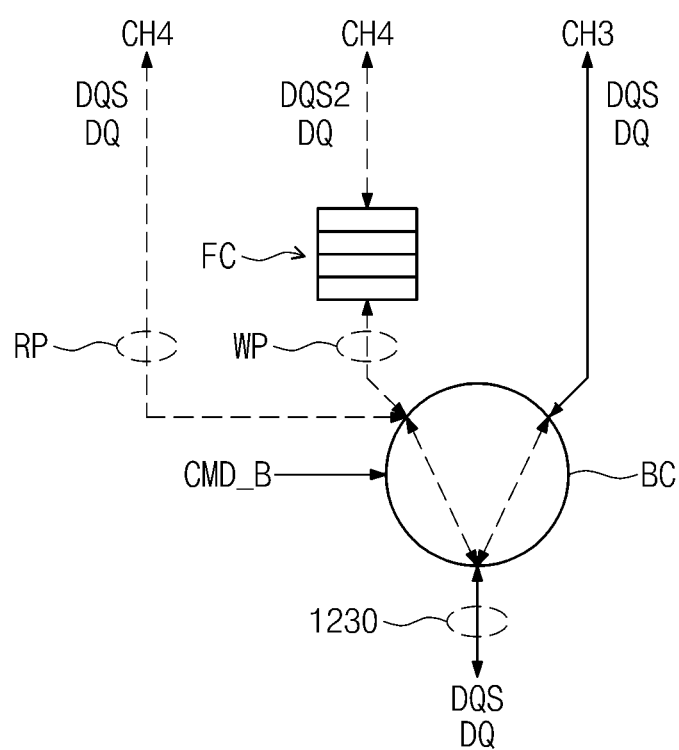
FIG. 4 illustrates another example of data buffers.

FIG. 4 illustrates another example of data buffers 110. Referring to FIG. 4, a data buffer 110_2 includes the FIFO circuit (FC) and the buffer circuit (BC). As compared with the data buffer 110_1 of FIG. 3, the data buffer 110_2 includes a write path (WP) and a read path (RP) connected to the fourth channel CH4.

The write path (WP) includes a path through which the data signals DQ stored in the buffer circuit (BC) are transmitted to the fourth channel CH4 (to the controller 150). The read path (RP) includes a path through which the data signals DQ are transmitted from the fourth channel CH4 (from the controller 150) to the buffer circuit (BC).

The buffer circuit (BC) is directly connected to the fourth channel CH4 (to the controller 150) through the read path (RP). For example, when the controller 150 transmits the data signals DQ to the data buffer 110_2 through the fourth channel CH4, the data signals DQ and the data strobe signals DQS can be directly transmitted from the controller 150 to the buffer circuit (BC) through the fourth channel CH4 and the read path (RP).

The FIFO circuit (FC) is provided on the write path (WP) between the buffer circuit (BC) and the fourth channel CH4. The data signals DQ transmitted from the buffer circuit (BC) to the fourth channel CH4 (to the controller 150) are stored in the FIFO circuit (FC) and then the stored data signals in the FIFO circuit (FC) may be transmitted to the controller 150 to be read by the controller 150.

A reading speed of the nonvolatile memory devices 160 is similar to a reading speed of the random access memory devices 140, and a write speed of the nonvolatile memory devices 160 may be lower than a write speed of the random access memory devices 140. As illustrated in FIG. 4, if the FIFO circuit (FC) is provided on the write path (WP) of the data buffer 110_2, a mismatch of access speeds of the random access memory devices 140 and the nonvolatile memory devices 160 that occurs due to low speed operation of the nonvolatile memory devices 160 may be compensated while minimizing resources needed to install the FIFO circuit (FC) and resources needed to manage the FIFO circuit (FC).

Figure 5:
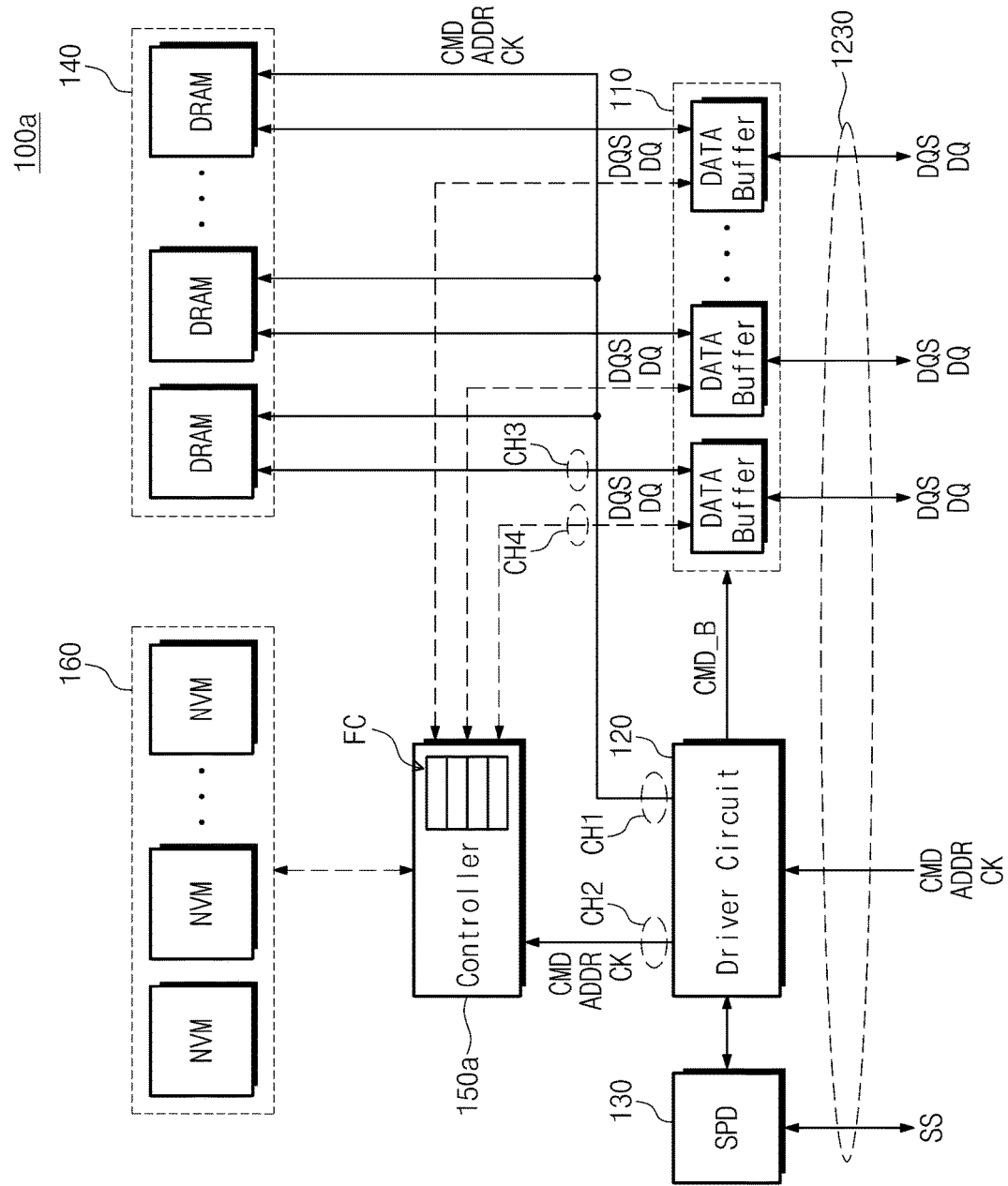
FIG. 5 illustrates a block diagram of an application example of the hybrid storage device of FIG. 2.

FIG. 5 illustrates a block diagram of an application example of the hybrid storage device of FIG. 2. Referring to FIGS. 1 and 5, the hybrid storage device 100a includes data buffers 110, driver circuit 120, serial presence detect (SPD) 130, random access memory devices 140, controller 150a and nonvolatile memory devices 160. The following description will focus on the differences between the hybrid storage device 100 shown in FIG. 2 and the hybrid storage device 100a shown in FIG. 5, and description of features in FIGS. 2 and 5 that are the same may be omitted for the sake of brevity.

As compared with the hybrid storage device 100 of FIG. 2, the controller 150a of the hybrid storage device 100a includes FIFO circuit (FC).

Similarly as described with reference to FIG. 3, the FIFO circuit (FC) in controller 150a of the hybrid storage device 100a shown in FIG. 5 is provided on a read path and a write path connected to a fourth channel CH4. Data signals DQ transmitted from the data buffers 110 to the controller 150a are firstly stored in the FIFO circuit (FC). The data signals DQ stored in the FIFO circuit (FC) are then written in the nonvolatile memory devices 160 by the controller 150a. Data signals DQ read from the nonvolatile memory devices 160 by the controller 150a are stored in the FIFO circuit (FC) before the data signals DQ are output to the data buffers 110, and after that the data signals DQ stored in the FIFO circuit (FC) are transmitted to the data buffers 110.

In some embodiments, similarly as described with reference to FIG. 4, the FIFO circuit (FC) in controller 150a of the hybrid storage device 100a shown in FIG. 5 may be provided on the write path connected to the fourth channel CH4. Data signals DQ transmitted from the data buffers 110 to the controller 150a may be firstly stored in the FIFO circuit (FC). The data signals DQ stored in the FIFO circuit (FC) may then be written in the nonvolatile memory devices 160 by the controller 150a. Data signals DQ read from the nonvolatile memory devices 160 by the controller 150a may be output directly to the data buffers 110 without being stored in the FIFO circuit (FC).

Figure 6:
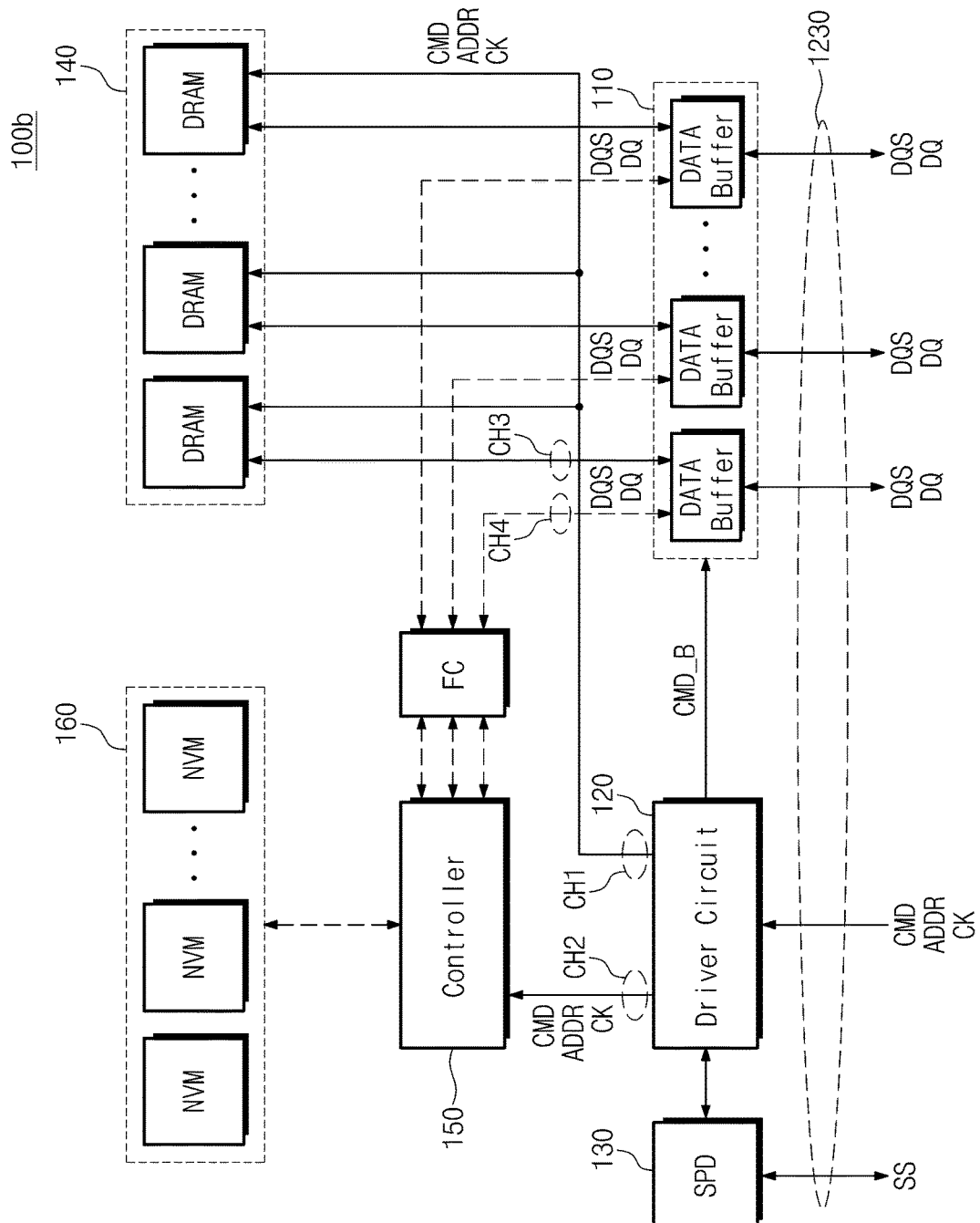
FIG. 6 illustrates a block diagram of another application example of the hybrid storage device of FIG. 2.

FIG. 6 illustrates a block diagram of another application example of the hybrid storage device of FIG. 2. Referring to FIGS. 1 and 6, the hybrid storage device 100b includes data buffers 110, driver circuit 120, serial presence detect (SPD) 130, random access memory devices 140, controller 150, nonvolatile memory devices 160 and FIFO circuit (FC). The following description will focus on the differences between the hybrid storage device 100 shown in FIG. 2 and the hybrid storage device 100b shown in FIG. 6, and description of features in FIGS. 2 and 6 that are the same may be omitted for the sake of brevity.

As compared with the hybrid storage device 100 of FIG. 2, the hybrid storage device 100b further includes the FIFO circuit (FC). The FIFO circuit (FC) is provided on a fourth channel CH4 between the data buffers 110 and the controller 150.

Similarly as described with reference to FIG. 3, the FIFO circuit (FC) is provided on a read path and a write path of the fourth channel CH4. Data signals DQ transmitted from the data buffers 110 to the controller 150 are firstly stored in the FIFO circuit (FC). The data signals DQ stored in the FIFO circuit (FC) are then transmitted to the controller 150. Data signals DQ read from the nonvolatile memory devices 160 by the controller 150 are stored in the FIFO circuit (FC), and after that the data signals DQ stored in the FIFO circuit (FC) are transmitted to the data buffers 110.

In some embodiments, similarly as described with reference to FIG. 4, the FIFO circuit (FC) of the hybrid storage device 100b shown in FIG. 6 may be provided on the write path of the fourth channel CH4. Data signals DQ transmitted from the data buffers 110 to the controller 150 may be stored in the FIFO circuit (FC). The data signals DQ stored in the FIFO circuit (FC) may then be transmitted to the controller 150. Data signals DQ read from the nonvolatile memory devices 160 by the controller 150 may be directly output to the data buffers 110 without passing through the FIFO circuit (FC).

Figure 7:
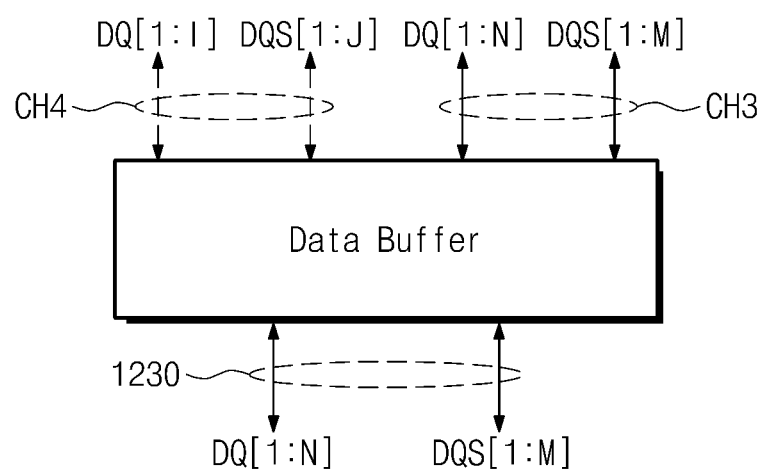
FIG. 7 illustrates an example of signal lines connected to data buffers.

FIG. 7 illustrates an example of signal lines connected to data buffers. Referring to FIGS. 2 and 7, each data buffer 110 can communicate with an external device through first through Nth data signal lines (DQ[1:N]) and first through Mth data strobe signal lines (DQS[1:M]). N and M are positive integers.

The third channel CH3 through which each data buffer 110 communicates with the random access memory devices 140 includes first through Nth data signal lines (DQ[1:N]) and first through Mth data strobe signal lines (DQS[1:M]). That is, when each data buffer 110 connects the high speed interface 1230 and the third channel CH3, each data buffer 110 can connect the first through Nth data signal lines (DQ[1:N]) and the first through Mth data strobe signal lines (DQS[1:M]) of the high speed interface 1230 to the first through Nth data signal lines (DQ[1:N]) and the first through Mth data strobe signal lines (DQS[1:M]) of the third channel CH3 respectively.

The fourth channel CH4 through which each data buffer 110 communicates with the controller 150 includes first through Ith data signal lines (DQ[1:I]) and first through Jth data strobe signal lines (DQS[1:J]). I may be a positive integer smaller than N and J may be a positive integer smaller than M. That is, when each data buffer 110 connects the high speed interface 1230 and the fourth channel CH4, each data buffer 110 can connect parts of the first through Nth data signal lines (DQ[1:N]) of the high speed interface 1230 to the first through Ith data signal lines (DQ[1:I]) of the fourth channel CH4 and connect parts of the first through Mth data strobe signal lines (DQS[1:M]) of the high speed interface 1230 to the first through Jth data strobe signal lines (DQS[1:J]) of the fourth channel CH4.

A bandwidth (e.g., the number of signal lines) within which the controller 150 communicates with the data buffers 110 may be smaller than a bandwidth (e.g., the number of signal lines) within which the random access memory devices 140 communicate with the data buffers 110. In this case, as illustrated in FIG. 7, parts of the first through Nth data signal lines (DQ[1:N]) and the first through Mth data strobe signal lines (DQS[1:M]) of the high speed interface 1230 may be connected to the controller 150.

Figure 8:
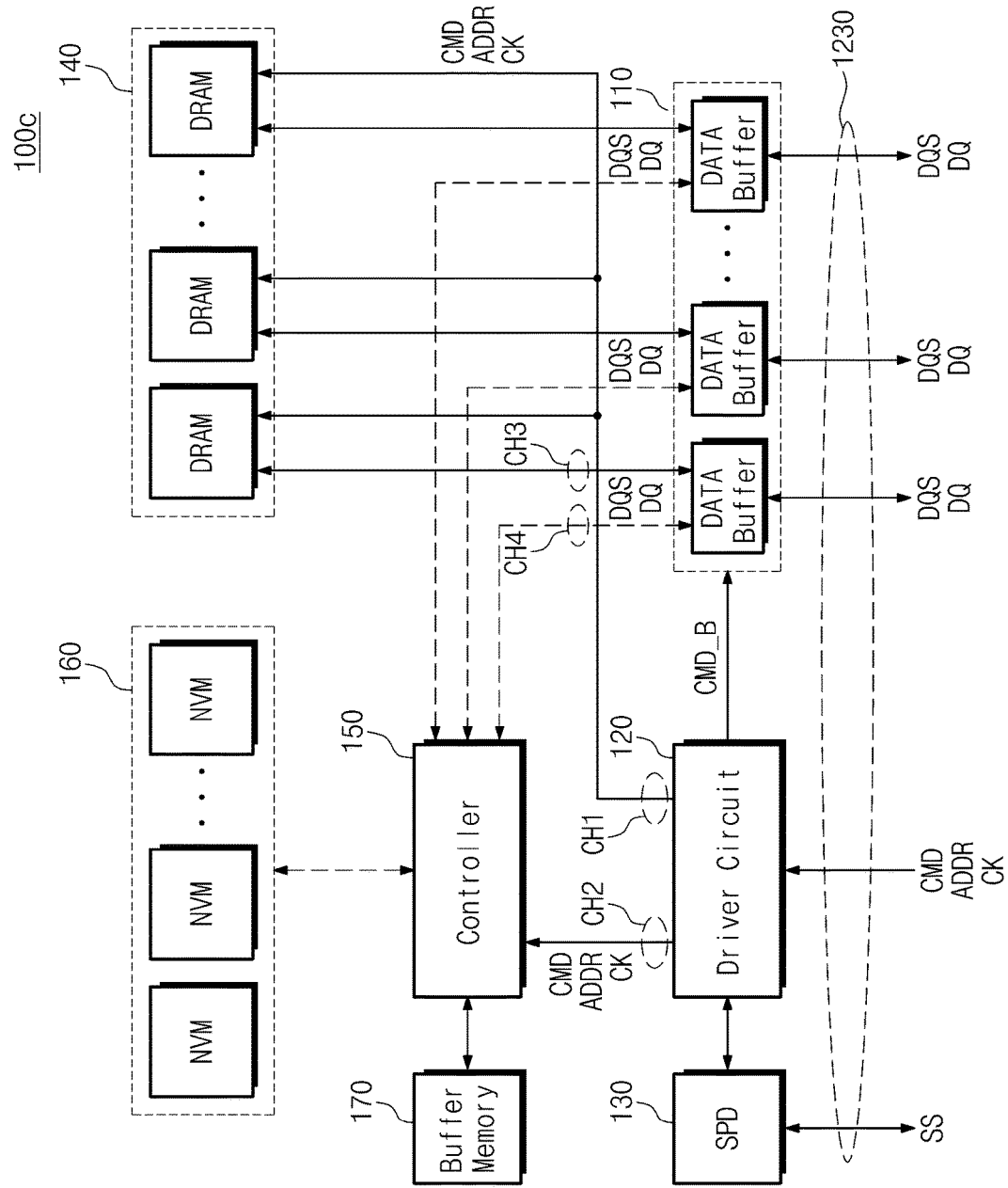
FIG. 8 illustrates a block diagram of still another application example of the hybrid storage device of FIG. 2.

FIG. 8 illustrates a block diagram illustrating still another application example of the hybrid storage device of FIG. 2. Referring to FIGS. 1 and 8, the hybrid storage device 100c includes data buffers 110, driver circuit 120, serial presence detect (SPD) 130, random access memory devices 140, controller 150, nonvolatile memory devices 160 and a buffer memory 170. The following description will focus on the differences between the hybrid storage device 100 shown in FIG. 2 and the hybrid storage device 100c shown in FIG. 8, and description of features in FIGS. 2 and 8 that are the same may be omitted for the sake of brevity.

The controller 150 stores data needed to control the nonvolatile memory devices 160 in the buffer memory 170. For example, the controller 150 can store and manage data needed to control a background operation of the nonvolatile memory devices 160 and data about a relation between a logical address of an external device and a physical address of the nonvolatile memory devices 160.

In some embodiments of the inventive concept, similarly as described with reference to FIGS. 3 and 4, a FIFO circuit may be provided as part of the data buffers 110 of the hybrid storage device 100c shown in FIG. 8. In other embodiments of the inventive concept, similarly as described with reference to FIG. 5, a FIFO circuit may be provided as part of the controller 150 of the hybrid storage device 100c. In still further embodiments of the inventive concept, similarly as described with reference to FIG. 6, a FIFO circuit may be provided in the fourth channel CH4 between the data buffers 110 and the controller 150.

Figure 9:
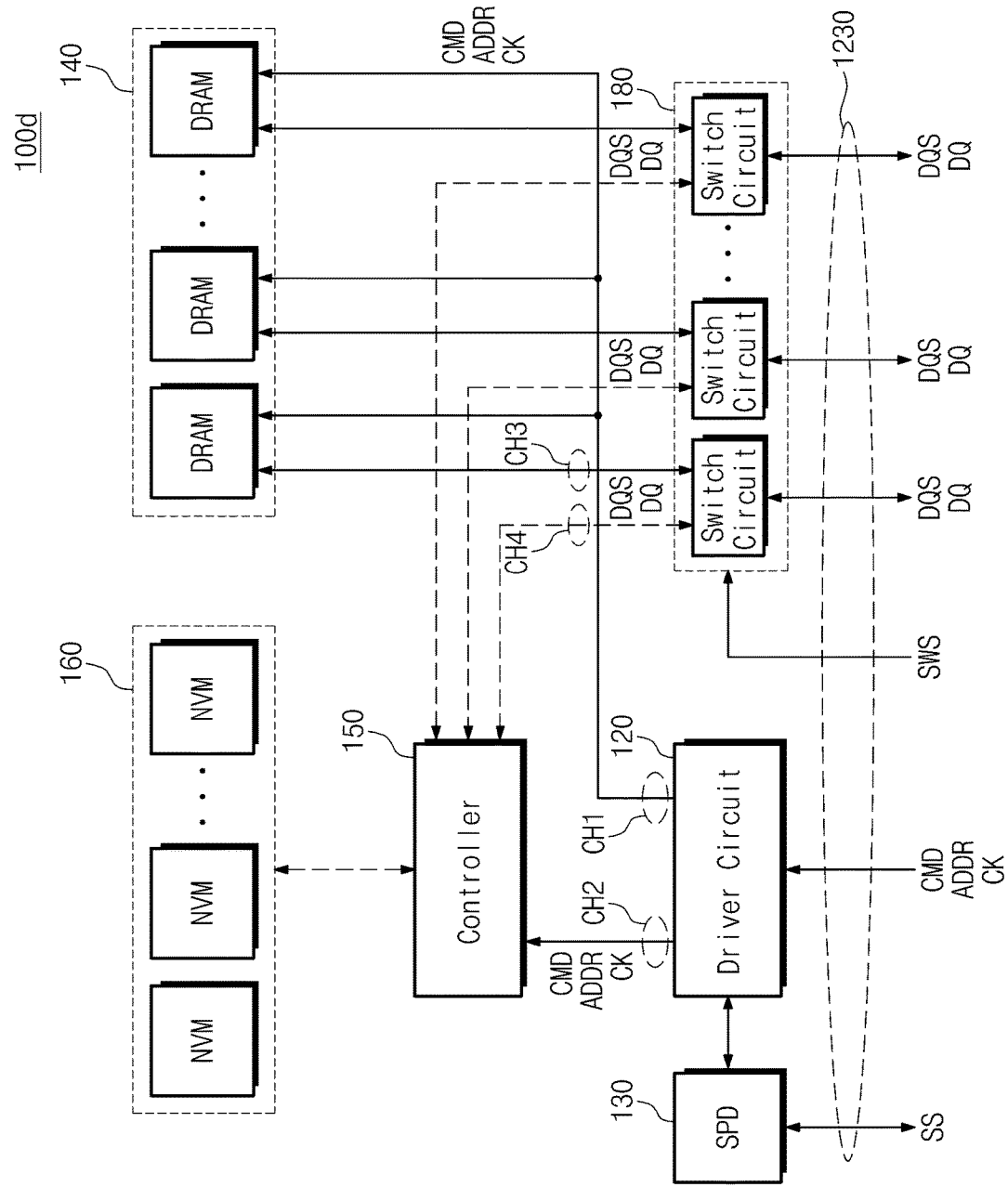
FIG. 9 illustrates a block diagram of yet another application example of the hybrid storage device of FIG. 2.

FIG. 9 illustrates a block diagram of yet another application example of the hybrid storage device of FIG. 2. Referring to FIGS. 1 and 9, the hybrid storage device 100d includes driver circuit 120, serial presence detect (SPD) 130, random access memory devices 140, controller 150, nonvolatile memory devices 160 and switch circuits 180. The following description will focus on the differences between the hybrid storage device 100 shown in FIG. 2 and the hybrid storage device 100d shown in FIG. 9, and description of features in FIGS. 2 and 9 that are the same may be omitted for the sake of brevity.

As compared with the hybrid storage device 100 of FIG. 2, the hybrid storage circuit 100d shown in FIG. 9 includes the switch circuits 180 instead of the data buffers 110. The switch circuits 180 electrically connect the high speed interface 1230 to one of the third channel CH3 and the fourth channel CH4 in response to a switch signal SWS. In some embodiments of the inventive concept, the switch circuits 180 are configured to provide only an electrical connection relation between the high speed interface 1230 and one of the third channel CH3 and the fourth channel CH4, and do not perform an operation of rearranging data signals DQS in synchronization with data strobe signals DQS. In other embodiments of the inventive concept, the switch circuits 180 are configured to not only provide the aforementioned electrical connection relation, but to also perform an operation of rearranging data signals DQS in synchronization with data strobe signals DQS.

The switch signals SWS controlling the switch circuits 180 may be received from the external device through the high speed interface 1230.

In some embodiments of the inventive concept, similarly as described with reference to FIGS. 3 and 4, a FIFO circuit may be provided as part of the switch circuits 180 shown in FIG. 9. In other embodiments of the inventive concept, similarly as described with reference to FIG. 5, a FIFO circuit may be provided as part of the controller 150. In still further embodiments of the inventive concept, similarly as described with reference to FIG. 6, a FIFO circuit may be provided in the fourth channel CH4 between the switch circuits 180 and the controller 150. In other embodiments of the inventive concept, similarly as described with reference to FIG. 7, the switch circuits 180 can connect data signal lines and strobe signal lines of the high speed interfaces 1230 to the third channel CH3, and connect parts of the data signal lines and parts of the strobe signal lines of the high speed interface 1230 to the fourth channel CH4.

Figure 10:
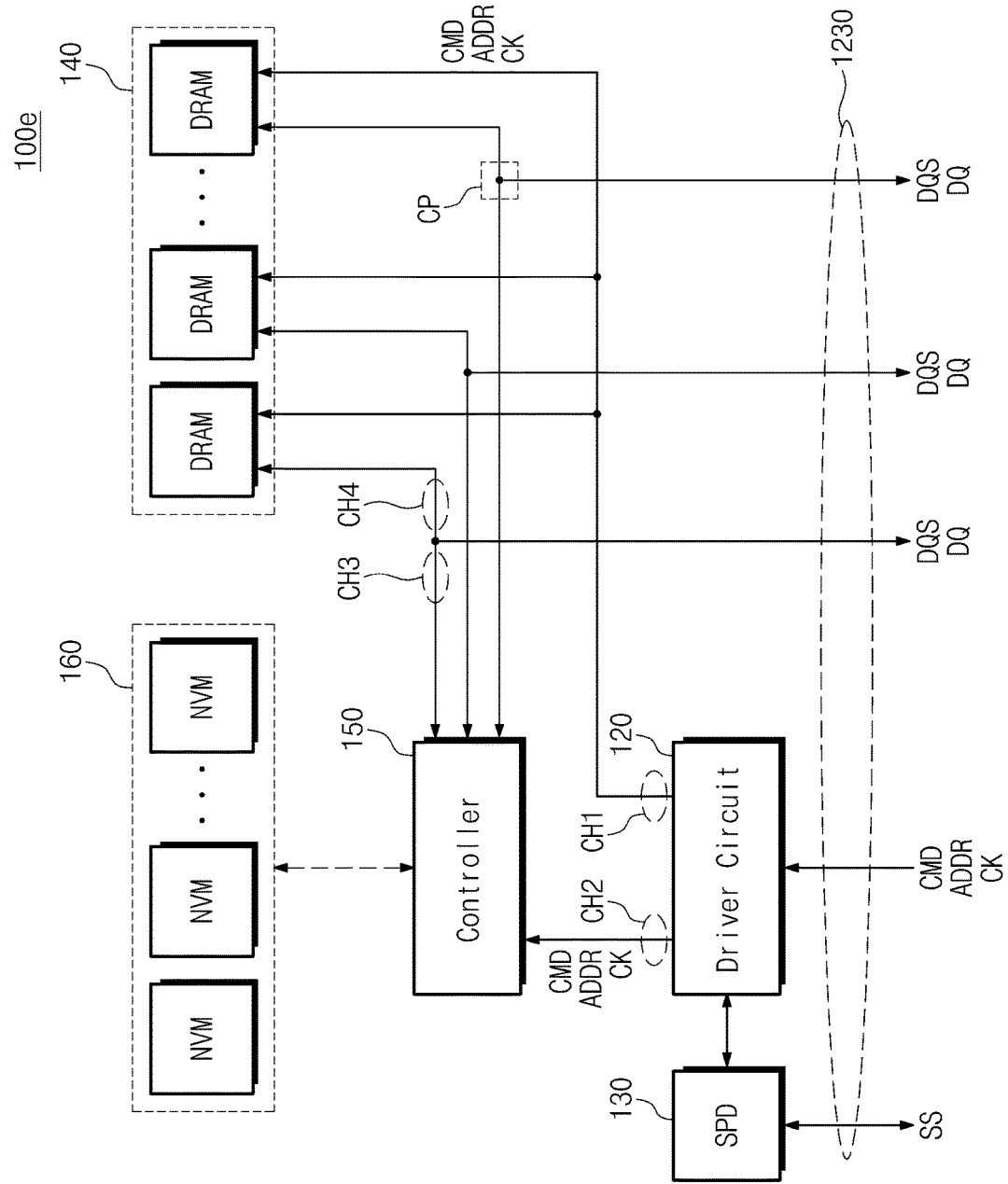
FIG. 10 illustrates a block diagram of still yet another application example of the hybrid storage device of FIG. 2.

FIG. 10 illustrates a block diagram of still yet another application example of the hybrid storage device of FIG. 2. Referring to FIGS. 1 and 10, the hybrid storage device 100e includes driver circuit 120, serial presence detect (SPD) 130, random access memory devices 140, controller 150, and nonvolatile memory devices 160. The following description will focus on the differences between the hybrid storage device 100 shown in FIG. 2 and the hybrid storage device 100e shown in FIG. 10, and description of features in FIGS. 2 and 10 that are the same may be omitted for the sake of brevity.

As compared with the hybrid storage device 100 of FIG. 2, the data buffers 110 are not provided in the hybrid storage device 100e shown in FIG. 10. Data signals DQ and data strobe signals DQS of the high speed interface 1230 are directly communicated with the random access memory devices 140 and the controller 150. That is, data signal lines and data strobe signal lines of the high speed interface 1230 branch off to the third channel CH3 and the fourth channel CH4 at connection points (CP).

Figure 11:
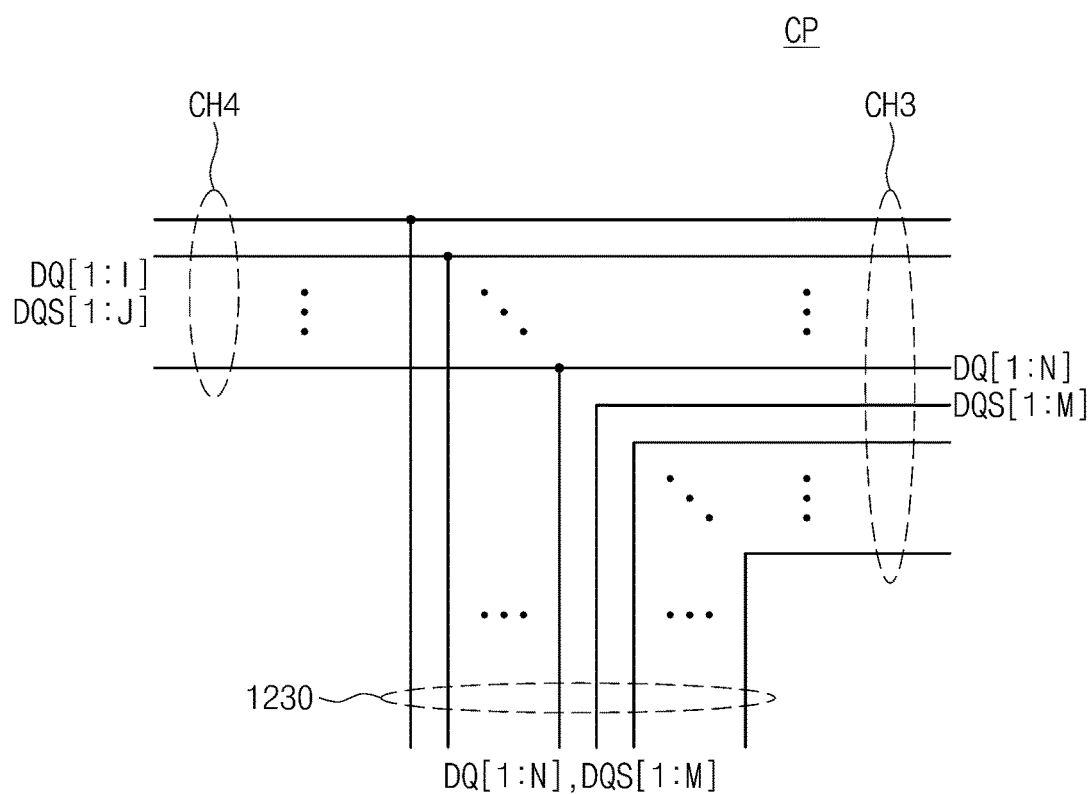
FIG. 11 illustrates an example of a connection point of FIG. 10.

FIG. 11 illustrates an example of a connection point (CP) of FIG. 10. Referring to FIGS. 10 and 11, although not all of the data signal lines and not all of the data strobe lines and corresponding connections may be shown, first through Nth data signal lines (DQ[1:N]) of the high speed interface 1230 are connected to first through Nth data lines (DQ[1:N]) of the third channel CH3 respectively. First through Mth data strobe signal lines (DQS[1:M]) of the high speed interface 1230 are connected to first through Mth data strobe lines (DQS[1:M]) of the third channel CH3 respectively. N and M are positive integers.

Parts of the first through Nth data signal lines (DQ[1:N]) of the high speed interface 1230 are connected to first through Ith data lines (DQ[1:I]) of the fourth channel CH4 respectively. Parts of the first through Mth data strobe signal lines (DQS[1:M]) of the high speed interface 1230 are connected to first through Jth data strobe lines (DQS[1:J]) of the fourth channel CH4 respectively. I is a positive integer smaller than N and J is a positive integer smaller than M.

Figure 12:
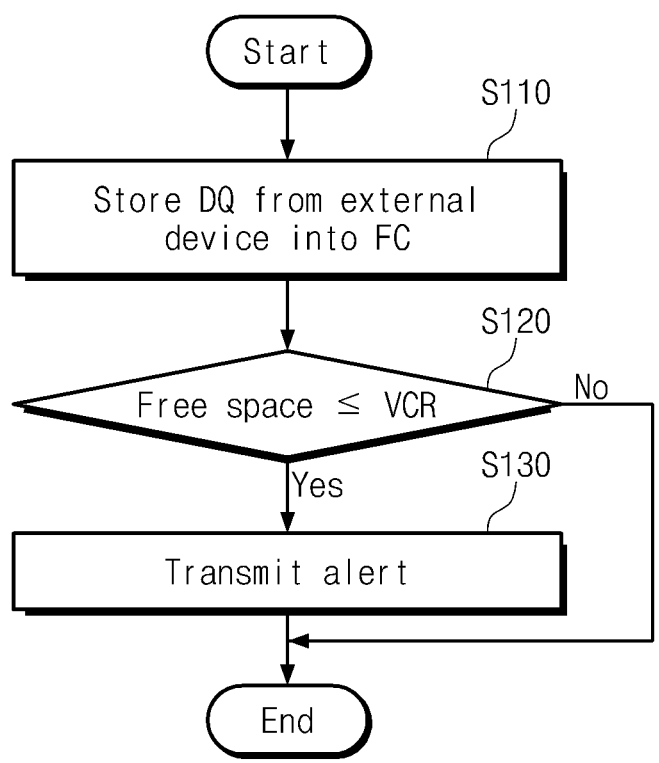
FIG. 12 illustrates a flowchart of an operation method of a hybrid storage device in accordance with some embodiments of the inventive concept.

FIG. 12 illustrates a flowchart of an operation method of a hybrid storage device in accordance with some embodiments of the inventive concept. Referring to FIGS. 2 and 12, in step S110, the hybrid storage device 100 stores data signals DQ received from an external device in a FIFO circuit (FC). For example, as described with reference to FIGS. 3 through 6, the FIFO circuit (FC) may be provided as part of the data buffers 110, as part of the controller 150, or in the fourth channel CH4 between the controller 150 and the data buffers 110.

In step S120, if available free space in the FIFO circuit (FC) is smaller than a critical value VCR, in step S130 the hybrid storage device 100 transmits a warning to the external device. For example, the hybrid storage device 100 can transmit a warning to the external device by activating or deactivating an Alert_n signal or a Save_n signal defined in a DIMM specification communicated between the SPD 130 and the external device as supplemental signals SS. The external device can communicate with the hybrid storage device 100 using supplemental signals SS in response to the warning. The hybrid storage device 100 can inform the external device that free space of the FIFO circuit (FC) is smaller than the critical value VCR through the supplemental signals SS.

In a case where available free space of the FIFO circuit (FC) is larger than the critical value VCR, the hybrid storage device 100 may not transmit a warning.

Figure 13:
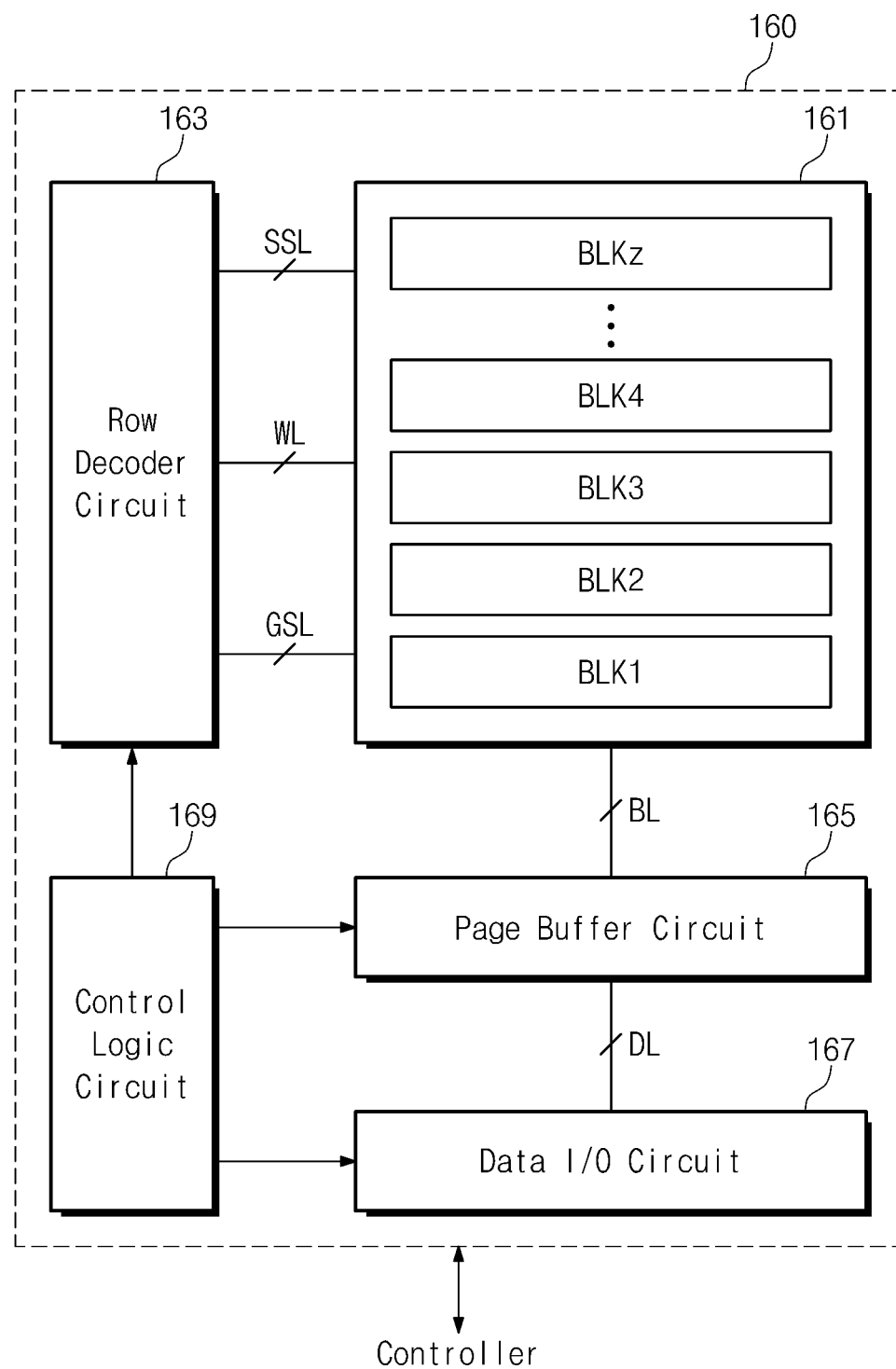
FIG. 13 illustrates a block diagram of one of nonvolatile memory devices in accordance with some embodiments of the inventive concept.

FIG. 13 illustrates a block diagram of one of nonvolatile memory devices 160 in accordance with some embodiments of the inventive concept. Referring to FIGS. 2 and 13, the memory device 160 includes memory cell array 161, row decoder circuit 163, page buffer circuit 165, data I/O (input/output) circuit 167, and control logic circuit 169.

The memory cell array 161 includes a plurality of memory blocks BLK1~BLKz. Each memory block includes a plurality of memory cells. Each memory block may be connected to the row decoder circuit 163 through at least one ground select line GSL, a plurality of word lines WL, and at least one string select line SSL. Each memory block may be connected to the page buffer circuit 165 through a plurality of bit lines BL. The memory blocks BLK1~BLKz may be connected to the bit lines BL in common. Memory cells of the memory blocks BLK1~BLKz may have the same structure. Each of the memory blocks BLK1~BLKz may be an erase operation unit. Memory cells of the memory cell array 161 may be erased by one memory block unit. Memory cells that belong to one memory block may be erased at the same time. Each memory block may be divided into a plurality of sub blocks. Each sub block may be an erase operation unit.

The row decoder circuit 163 is connected to the memory cell array 161 through a plurality of ground select lines GSL, a plurality of word lines WL, and a plurality of string select lines SSL. The row decoder circuit 163 operates according to a control of the control logic circuit 169. The row decoder circuit 163 decodes an address received through an I/O (input/output) channel from the controller 150 and control voltages applied to the string select lines SSL, the word lines WL and the ground select lines GSL according to the decoded address.

For example, in a program operation, the row decoder circuit 163 applies a program voltage (VPGM) to a selected word line of a memory block selected by an address and applies a pass voltage (VPASS) to unselected word lines of the selected memory block. In a read operation, the row decoder circuit 163 applies a select read voltage (VRD) to a selected word line of a memory block selected by an address and applies an unselect read voltage (VREAD) to unselected word lines of the selected memory block. In an erase operation, the row decoder circuit 163 applies erase voltages (e.g., a ground voltage or voltages having levels similar to the ground voltage) to word lines of a memory block selected by an address.

The page buffer circuit 165 is connected to the memory cell array 161 through the bit lines BL. The page buffer circuit 165 is connected to the data input/output circuit 167 through a plurality of data lines DL. The page buffer circuit 165 operates under the control of the control logic circuit 169.

In a program operation, the page buffer circuit 165 stores data to be programmed in memory cells. On the basis of the stored data, the page buffer circuit 165 applies voltages to the bit lines BL. For example, the page buffer circuit 165 may function as a write driver. In a read operation, the page buffer circuit 165 senses voltages of the bit lines BL and stores a sensing result. For example, the page buffer circuit 165 may function as a sense amplifier.

The data I/O circuit 167 is connected to the page buffer circuit 165 through the data lines DL. The data I/O circuit 167 outputs data read by the page buffer circuit 165 to the controller 150 through the I/O channel, and transfers data received from the controller 150 through the I/O channel to the page buffer circuit 165.

The control logic circuit 169 receives a command from the controller 150 through the I/O channel and receives a control signal through a control channel. The control logic circuit 169 receives a command received through the I/O channel in response to the control signal, routes an address received through the I/O channel to the row decoder circuit 163, and routes data received through the I/O channel to the data input/output circuit 167. The control logic circuit 169 decodes the received command and controls the nonvolatile memory device 160 according to the decoded command.

In a read operation, the control logic circuit 169 generates a second data strobe signal (DQS) from a read enable signal (/RE) received from the controller 150 through the control channel. The generated second data strobe signal (DQS) may be output to the controller 150 through the control channel. In a write operation, the control logic circuit 169 receives the second data strobe signal (DQS) from the controller 150 through the control channel.

Figure 14:
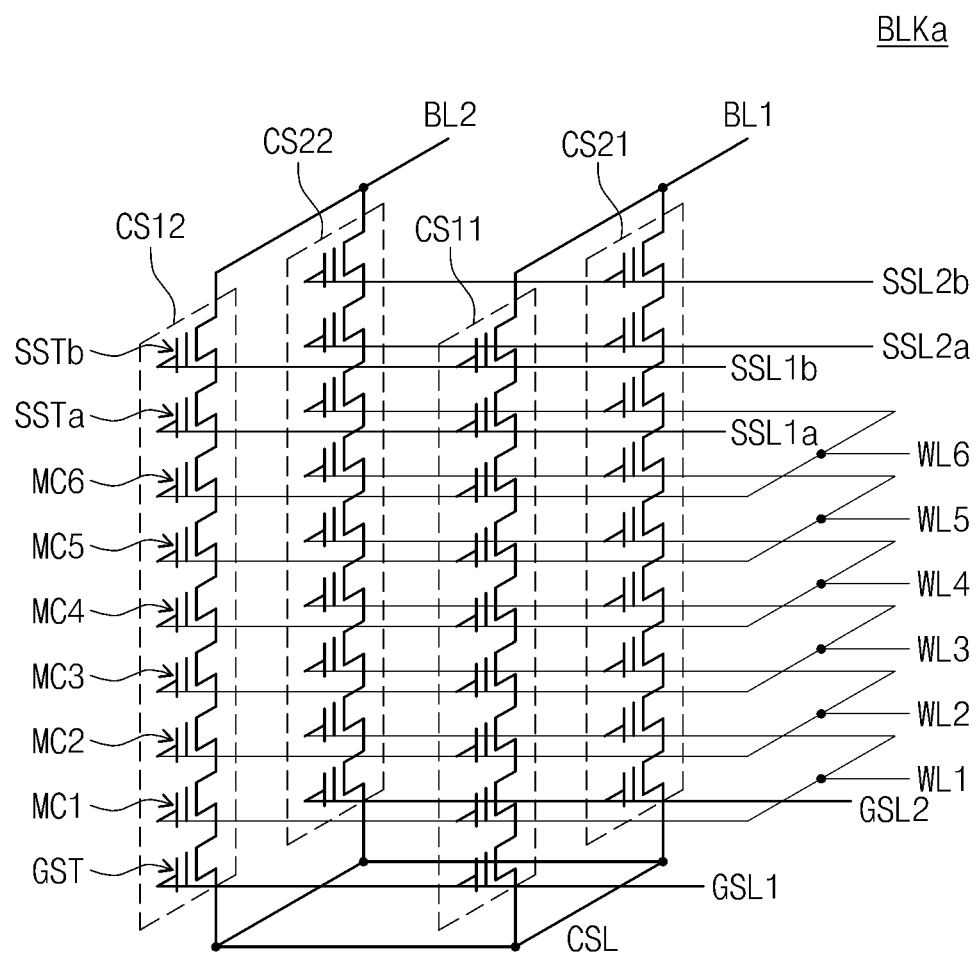
FIG. 14 illustrates a circuit diagram of a memory block in accordance with some embodiments of the inventive concept.
Figure 14:
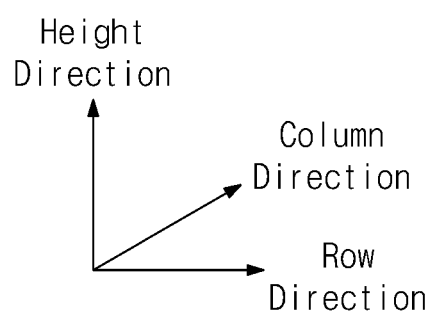

FIG. 14 is a circuit diagram illustrating a memory block in accordance with some embodiments of the inventive concept. Referring to FIG. 14, the memory block BLKa includes a plurality of cell strings (CS11~CS21, CS12~CS22). The cell strings (CS11~CS21, CS12~CS22) may be arranged along a row direction and a column direction to form rows and columns.

For example, the cell strings CS11 and CS12 arranged along the row direction may form a first row, and the cell strings CS21 and CS22 arranged along the row direction may form a second row. The cell strings CS11 and CS21 arranged along the column direction may form a first column, and the cell strings CS12 and CS22 arranged along the column direction may form a second column.

Each cell string may include a plurality of transistors. The cell transistors include ground select transistors GST, memory cells MC1~MC6, and string select transistors SSTa and SSTb. The ground select transistor GST, the memory cells MC1~MC6 and string select transistors SSTa and SSTb of each cell string may be laminated in a height direction perpendicular to a plane (e.g., a plane on a substrate of the memory block BLKa) on which the cell strings (CS11~CS21, CS12~CS22) are arranged along rows and columns.

The cell transistors may be charge trap type transistors having threshold voltages that vary depending on the amounts of charges trapped in an insulating layer.

Sources of the lowermost ground select transistors GST may be connected to a common source line CSL in common.

Control gates of the ground select transistors GST of the cell strings (CS11~CS21, CS12~CS22) may be connected to ground select lines GSL1 and GSL2 respectively. Ground select transistors of the same row may be connected to the same ground select line, and ground select transistors of different rows may be connected to different ground select lines. For example, ground select transistors GST of the cell strings CS11 and CS12 of the first row may be connected to the first ground select line GSL1, and ground select transistors GST of the cell strings CS21 and CS22 of the second row may be connected to the second ground select line GSL2.

Control gates of memory cells located at the same height (or order) from a substrate (or ground select transistors GST) may be connected to one word line in common, and control gates of memory cells located at different heights (or orders) from the substrate (or ground select transistors GST) may be connected to different word lines WL1~WL6 respectively. For example, the memory cells MC1 are connected to the word line WL1 in common. The memory cells MC2 are connected to the word line WL2 in common. The memory cells MC3 are connected to the word line WL3 in common. The memory cells MC4 are connected to the word line WL4 in common. The memory cells MC5 are connected to the word line WL5 in common. The memory cells MC6 are connected to the word line WL6 in common.

At first string select transistors SSTa of the same height (or order) of the cell strings (CS11~CS21, CS12~CS22), control gates of the first string select transistors SSTa of different rows are connected to different string select lines SSL1a~SSL2a respectively. For example, the first string select transistors SSTa of the cell strings CS11 and CS12 are connected to the string select line SSL1a in common. The first string select transistors SSTa of the cell strings CS21 and CS22 are connected to the string select line SSL2a in common.

At second string select transistors SSTb of the same height (or order) of the cell strings (CS11~CS21, CS12~CS22), control gates of the second string select transistors SSTb of different rows are connected to different string select lines SSL1b~SSL2b respectively. For example, the second string select transistors SSTb of the cell strings CS11 and CS12 are connected to the string select line SSL1b in common. The second string select transistors SSTb of the cell strings CS21 and CS22 are connected to the string select line SSL2b in common.

That is, cell strings of different rows are connected to different string select lines. String select transistors of the same height (or order) of cell strings of the same row are connected to the same string select line. String select transistors of different heights (or orders) of cell strings of the same row are connected to different string select lines.

String select transistors of cell strings of the same row may be connected to one string select line in common. For example, the string select transistors SSTa and SSTb of the cell strings CS11 and CS12 of the first row may be connected to one string select line in common. The string select transistors SSTa and SSTb of the cell strings CS21 and CS22 of the second row may be connected to one string select line in common.

Columns of the cell strings (CS11~CS21, CS12~CS22) are connected to different bit lines BL1 and BL2 respectively. For example, the string select transistors SSTb of the cell strings CS11~CS21 of the first column are connected to the bit line BL1 in common. The string select transistors SSTb of the cell strings CS12~CS22 of the second column are connected to the bit line BL2 in common.

The cell strings CS11 and CS12 may form a first plane. The cell strings CS21 and CS22 may form a second plane.

In a memory block BLKa, memory cells of each height of each plane may form a physical page. The physical page may be a write unit and a read unit of the memory cells MC1~MC6. For example, one plane of the memory block BLKa may be selected by the string select lines SSL1a, SSL1b, SSL2a and SSL2b. When a turn-on voltage is supplied to the string select lines SSL1a and SSL1b and a turn-off voltage is supplied to the string select lines SSL2a and SSL2b, the cell strings CS11 and CS12 of the first plane are connected to the bit lines BL1 and BL2. That is, the first plane is selected. When a turn-on voltage is supplied to the string select lines SSL2a and SSL2b and a turn-off voltage is supplied to the string select lines SSL1a and SSL1b, the cell strings CS21 and CS22 of the second plane are connected to the bit lines BL1 and BL2. That is, the second plane is selected. In the selected plane, one row of the memory cells MC may be selected by the word lines WL1~WL6. In the selected row, a select voltage may be applied to the second word line WL2 and an unselect voltage may be applied to the remaining word lines WL1 and WL3~WL6. That is, a physical page corresponding to the second word line WL2 of the second plane may be selected by adjusting voltages of the string select lines SSL1a, SSL1b, SSL2a and SSL2b and the word lines WL1~WL6. In the memory cells MC2 of the selected physical page, a write or read operation may be performed.

In the memory block BLKa, an erase of the memory cells MC1~MC6 may be performed by a memory block unit or a sub block unit. When an erase operation is performed by a memory block unit, all the memory cells MC of the memory block BLKa may be erased at the same time according to an erase request (e.g., an erase request from an external memory controller). When an erase operation is performed by a sub block unit, a part of the memory cells MC1~MC6 of the memory block BLKa may be erased at the same time according to an erase request and the remaining memory cells may be erase-prohibited. A low voltage (for example, a ground voltage or a voltage having a level similar to the ground voltage) may be supplied to a word line connected to memory cells MC being erased and a word line connected to erase-prohibited memory cells MC may be floated.

The memory block BLKa illustrated in FIG. 14 is illustrative. The inventive concept is not limited to the memory block BLKa illustrated in FIG. 14. For example, the number of rows of the cell strings may increase or decrease. As the number of rows of the cell strings is changed, the number of string select lines or ground select lines that are connected to the rows of the cell strings and the number of cell strings connected to one bit line may also be changed.

The number of columns of the cell strings may increase or decrease. As the number of columns of the cell strings is changed, the number of bit lines connected to the columns of the cell strings and the number of cell strings connected to one string select line may also be changed.

A height of the cell strings may increase or decrease. For example, the number of ground select transistors, memory cells or string select transistors that are laminated on each of the cell strings may increase or decrease.

Memory cells MC that belong to one physical page may correspond to at least three logical pages. For example, k (k is a positive integer greater than 2) number of bits may be programmed into one memory cell MC. In memory cells MC that belong to one physical page, k number of bits being programmed into each memory cell MC may form k number of logical pages respectively.

In an embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure as the memory cells and being formed monolithically together with the memory cells.

The following patent documents, which are hereby incorporated by reference, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and US Pat. Pub. No. 2011/0233648.

Figure 15:
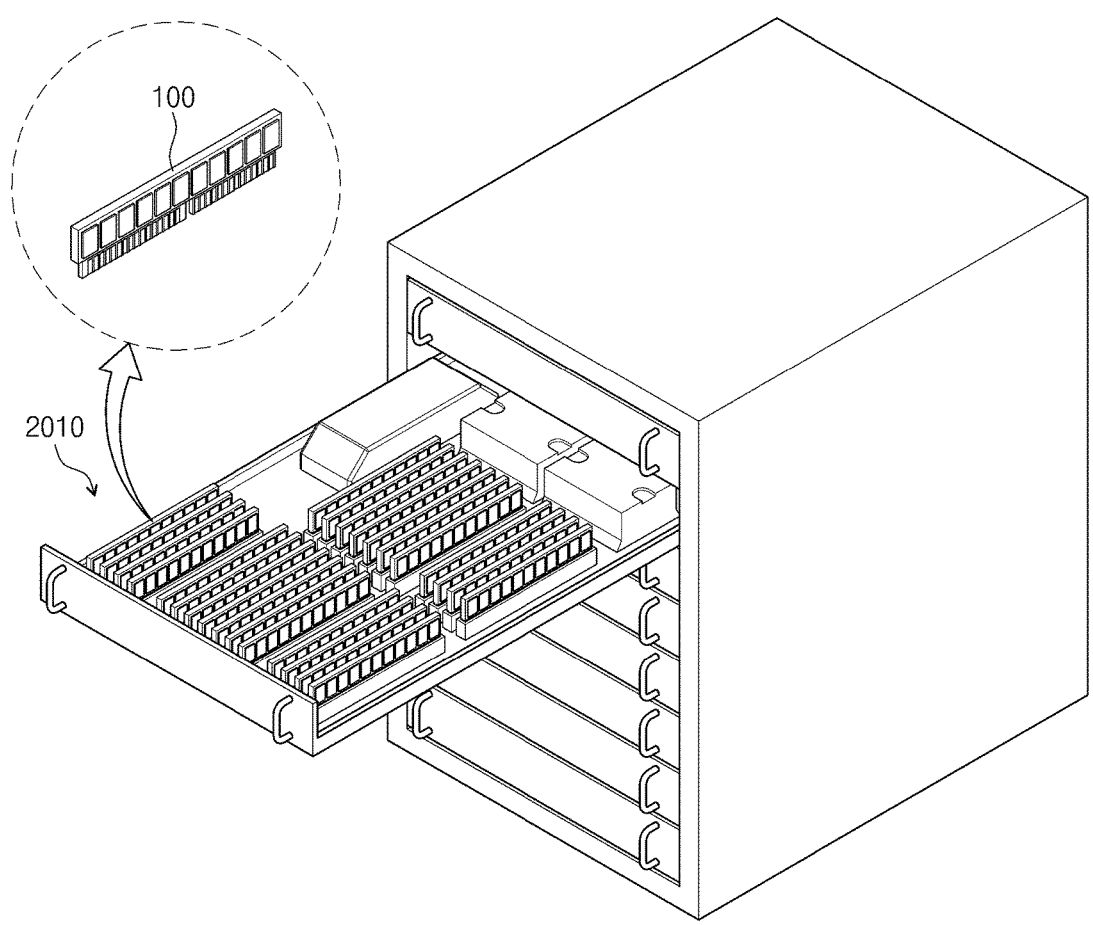
FIG. 15 illustrates an example of a server device on which at least one of hybrid storage devices in accordance with some embodiments of the inventive concept is mounted.

FIG. 15 illustrates an example of a server device 2000 on which at least one of hybrid storage devices (100, 100a~100e) in accordance with some embodiments of the inventive concept is mounted. Referring to FIG. 15, the server device 2000 may include at least two racks 2010. At least two hybrid storage devices 100 may be mounted on each of the racks 2010.

Each of the racks 2010 can mount at least one of the hybrid storage devices (100, 100a~100e), the main memory devices 1210, at least one processor 1100, at least one chipset 1300, and at least one storage device 1700. The I/O device 1600, the graphic processor 1400, and the display device 1500 may be provided to the server device 2000.

According to some embodiments of the inventive concept, nonvolatile memory devices are connected to a host device through a high speed interface. The nonvolatile memory devices or random access memory devices are freely accessed according to an intention of the host device. Thus, a storage device having improved speed and improved flexibility is provided.

Although a few embodiments of the present general inventive concept have been shown and described, it should be appreciated by those skilled in the art that changes may be made in these embodiments without departing from the principles and spirit of the general inventive concept, the scope of which is defined in the appended claims and their equivalents. Therefore, the above-disclosed subject matter is to be considered illustrative, and not restrictive.

What is claimed is:

1. A storage device comprising:
   a plurality of random access memory devices;
   a plurality of nonvolatile memory devices;
   a controller configured to control the nonvolatile memory devices;
   a driver circuit configured to receive a command and an address from an external device, output a buffer command according to the command and the address, and transmit the command and the address to one of a first channel connected to the random access memory devices and a second channel connected to the controller according to the command and the address; and a plurality of data buffers configured to communicate with the external device and to electrically connect the external device selectively to a third channel connected to the random access memory devices and a fourth channel connected to the controller in response to the buffer command, wherein the data buffers respectively comprise first-in first-out (FIFO) circuits, and wherein the plurality of data buffers connect the external device to the third channel without the FIFO circuits and connect the external device to the fourth channel through the FIFO circuits.

2. The storage device of claim 1, wherein the fourth channel comprises pairs of a write path and a read path respectively corresponding to the data buffers, and wherein the FIFO circuits of the data buffers are connected to respective ones of the write paths of the pairs.

3. The storage device of claim 1, wherein the controller comprises a second FIFO circuit disposed between the fourth channel and the nonvolatile memory devices.

4. The storage device of claim 3, wherein the second FIFO circuit is provided on a signal path that sends data to the nonvolatile memory devices from the fourth channel.

5. The storage device of claim 1, further comprising a second FIFO circuit connected between the controller and the data buffers.

6. The storage device of claim 5, wherein the fourth channel comprises a write path and a read path, and the second FIFO circuit is disposed on the write path of the fourth channel.

7. The storage device of claim 1, wherein each of the data buffers is configured to communicate with the external device through M signal lines, to electrically connect parts of the M signal lines to N signal lines of the fourth channel in response to the buffer command and to electrically connect the M signal lines to M signal lines of the third channel in response to the buffer command, wherein M is a positive integer and N is a positive integer smaller than M.

8. The storage device of claim 1, further comprising a buffer memory configured to store data that enables the controller to control operation of the nonvolatile memory devices.

9. The storage device of claim 1, wherein the driver circuit and the data buffers are configured to communicate with the external device based on a dual in-line memory module (DIMM) interface.

10. A storage device comprising:
a plurality of random access memory devices;
a plurality of nonvolatile memory devices;
a controller configured to control the nonvolatile memory devices;
a driver circuit configured to receive a command and an address from an external device, output a buffer command according to the command and the address, and to transmit the command and the address to one of a first channel connected to the random access memory devices and a second channel connected to the controller according to the command and the address; and
a plurality of data buffers configured to communicate with the external device and to electrically connect the external device selectively to a third channel connected to the random access memory devices and a fourth channel connected to the controller in response to the buffer command, wherein the controller comprises a first-in first-out (FIFO) circuit connected to the fourth channel, and wherein the plurality of data buffers connect the external device to the third channel without the FIFO circuit and connect the external device to the FIFO circuit through the fourth channel.

11. The storage device of claim 10, wherein the plurality of data buffers are configured to electrically connect the external device to one of the third channel and the fourth channel in response to a switch signal.

12. The storage device of claim 11, wherein the switch signal is received from the external device.

13. The storage device of claim 10, wherein the third channel comprises M signal lines, wherein the fourth channel comprises N signal lines, wherein the fourth channel is connected to a part of the third channel, and wherein M is a positive integer and N is a positive integer smaller than M.

14. The storage device of claim 10, wherein the driver circuit is configured to determine when free space in the FIFO circuit is smaller than a critical value, and transmit a warning signal to the external device indicative that the free space is smaller than the critical value based on determination by the driver circuit.

15. A storage device comprising:
a plurality of random access memories;
a plurality of nonvolatile memory devices;
a plurality of data buffers configured to communicate with an external device and to electrically connect the external device selectively with the random access memories and the nonvolatile memory devices responsive to a buffer command; and
a first-in first-out (FIFO) circuit disposed in a first channel between the data buffers and the nonvolatile memory devices, and configured to store data provided by the external device and output the stored data to the nonvolatile memory devices, wherein the first channel has a bandwidth smaller than a bandwidth of a second channel between the data buffers and the random access memories, wherein the first channel comprises M signal lines, the second channel comprises N signal lines, and the second channel is connected to a part of the first channel, and wherein M is a positive integer and N is a positive integer smaller than M, and wherein the plurality of data buffers connect the external device to the second channel without the FIFO circuit and connect the external device to the FIFO through the first channel.

16. The storage device of claim 15, further comprising a driver circuit configured to generate the buffer command responsive to a command and an address received from the external device.

17. The storage device of claim 16, wherein the driver circuit and the data buffers are configured to communicate with the external device based on a dual in-line memory module (DIMM) interface.

18. The storage device of claim 16, wherein when free space in the FIFO circuit is smaller than a critical value, the driver circuit is configured to transmit a warning signal to the external device.

19. The storage device of claim 15, wherein each of the data buffers comprises a second FIFO circuit.

* * * * *